July 10, 1945.  A. G. CONRAD  2,379,867
ADJUSTABLE-SPEED POLYPHASE ALTERNATING-CURRENT MOTOR-APPARATUS
Filed Oct. 23, 1942  5 Sheets-Sheet 1
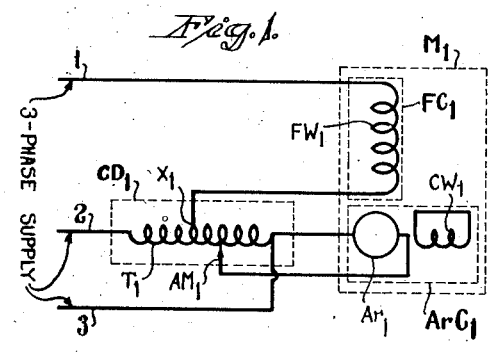
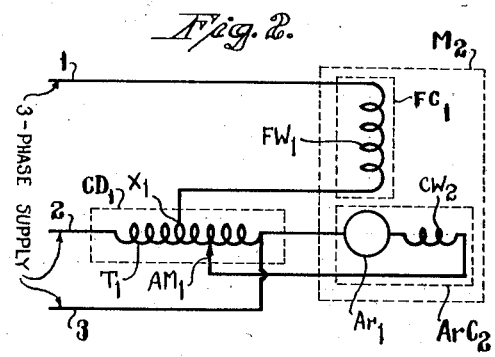
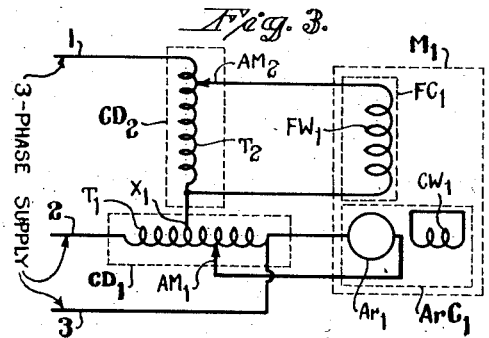
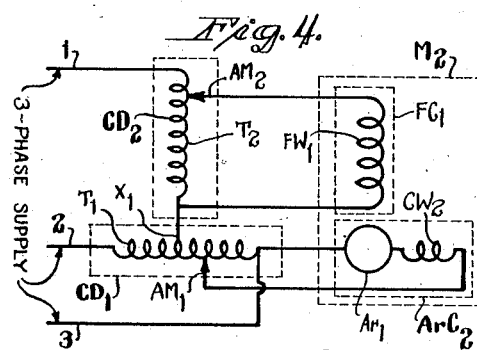
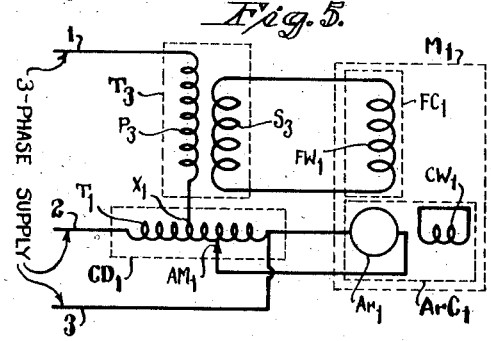
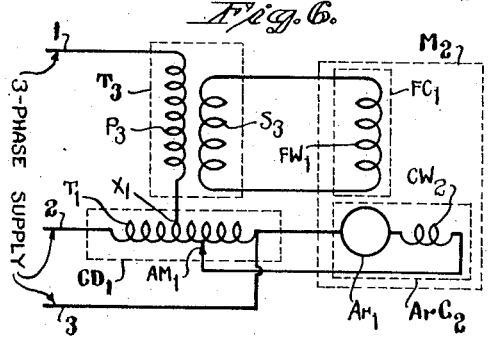
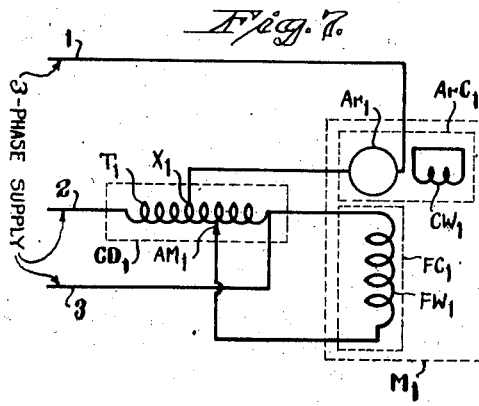
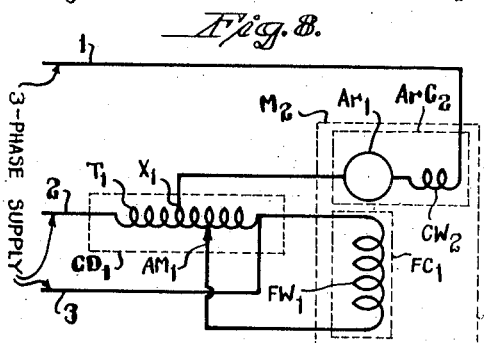
Inventor
Albert G. Conrad
by Seymour Earl Nichols
Attorneys

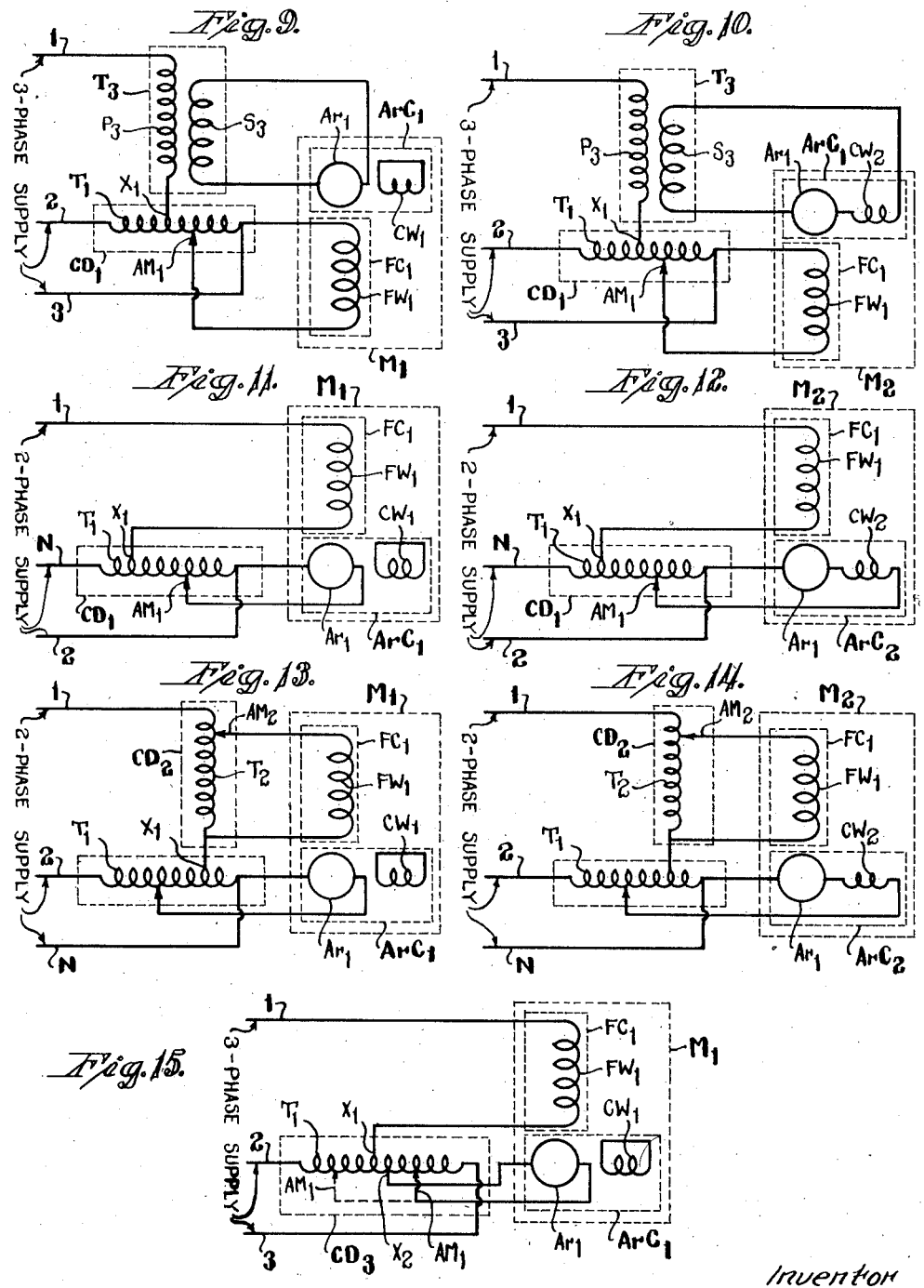

Patented July 10, 1945

2,379,867

UNITED STATES PATENT OFFICE 2,379,867

ADJUSTABLE-SPEED POLYPHASE ALTERNATING-CURRENT MOTOR APPARATUS

Albert G. Conrad, Mount Carmel, Conn., assignor to Superior Electric Company, Bristol, Conn., a partnership Application October 23, 1942, Serial No. 463,038

4 Claims. (Cl. 172—274)

The present invention relates to improvements in polyphase alternating-current motor-apparatus, i. e., polyphase alternating-current motors per se and associated control means. More particularly, the present invention relates to improvements in adjustable-speed polyphase alternating-current motor-apparatus, as will be more fully apparent from the following.

One of the objects of the present invention is to provide a superior polyphase alternating-current motor-apparatus capable of operating from a polyphase current supply at substantially constant speed for different values of horsepower output.

Another object of the present invention is to provide a superior motor-apparatus of the general character referred to, which will operate with a high power-factor or a leading power-factor over substantially its entire speed range or load range.

A further object of the present invention is to provide a polyphase alternating-current motor-apparatus by means of which speed-adjustments may be made over a wide range of speeds comparable with the range provided by the well-known "Ward-Leonard" direct-current system.

Still another object of the present invention is to provide a superior motor-apparatus of the character referred to by means of which current for the motor-field is provided which is in phase or approximately in phase with the armature current, to thereby provide high values of torque.

A still further object of the present invention is to provide a superior adjustable-speed polyphase alternating-current motor-apparatus in which compensating-winding means is provided in the motor which serves to minimize leakage-reactance voltage-drops to thereby minimize reduction in speeds due to increased motor loads.

Another object of the present invention is to provide superior low cost means for obtaining an adjustable drive from a polyphase alternating-current power supply.

A still further object of the present invention is to provide superior means whereby a motor of the character described may be reversed in direction of rotation without changing its characteristics.

A further object of the present invention is to provide a superior motor-apparatus of the character referred to, which will provide substantially constant speeds for any one of a variety of selected torques.

Still another object of the present invention is to provide a superior adjustable-speed polyphase A. C. motor-apparatus which will produce any one of a variety of selected torques at any selected speed within the range of the given motor-apparatus.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a schematic or diagrammatic view showing one form of motor-apparatus embodying the present invention and in which the compensating-winding is inductively coupled to the commutator-type armature, the motor-apparatus being shown as connected to a 3-phase supply;

Fig. 2 is a similar view but showing the compensating-winding electrically coupled to the commutator-type armature;

Fig. 3 is a view showing a motor-apparatus corresponding to that shown in Fig. 1, but showing the addition thereto of an adjustable auto-transformer for controlling the field-voltage;

Fig. 4 is a view showing a motor-apparatus corresponding to that shown in Fig. 2, but showing the addition thereto of an adjustable auto-transformer for varying the voltage of the field-winding;

Fig. 5 is a schematic view showing a motor-apparatus corresponding to that of Fig. 1, but illustrating the inclusion of a two-winding transformer situated for supplying the field-voltage;

Fig. 6 is a schematic view illustrating a motor-apparatus corresponding to Fig. 2, but showing the inclusion therewith of a two-winding transformer situated for supplying the field-voltage;

Fig. 7 is a schematic view similar to that of Fig. 1, but showing the armature-circuit and the field-circuit respectively transposed with relationship to the 3-phase supply;

Fig. 8 is a view generally corresponding to Fig. 2, but showing the armature-circuit and the field-circuit respectively transposed in relationship to the 3-phase supply;

Fig. 9 is a view of a motor-apparatus generally corresponding to that illustrated in Fig. 7 but showing the employment of a two-winding transformer to adapt a low-voltage armature-circuit to a relatively-high-voltage supply;

Fig. 10 is a view of a motor-apparatus generally corresponding to that shown in Fig. 8 but illustrating the employment of a two-winding transformer to adapt a low-voltage armature-circuit to a relatively-high-voltage supply;

Fig. 11 is a schematic view illustrating how the motor-apparatus of Fig. 1 may be adapted to a 2-phase supply;

Fig. 12 is a schematic view illustrating how the showing of Fig. 2 may be adapted to a 2-phase supply;

Fig. 13 is a schematic view illustrating an arrangement whereby the showing of Fig. 3 may be adapted to a 2-phase supply;

Fig. 14 is a similar view but illustrating how the showing of Fig. 4 may be adapted to a 2-phase supply;

Fig. 15 is a schematic view of the general character of Fig. 1 and showing how the armature-circuit may have its connections shifted with respect to the transformer to effect a reversal of the motor;

Figure 16:
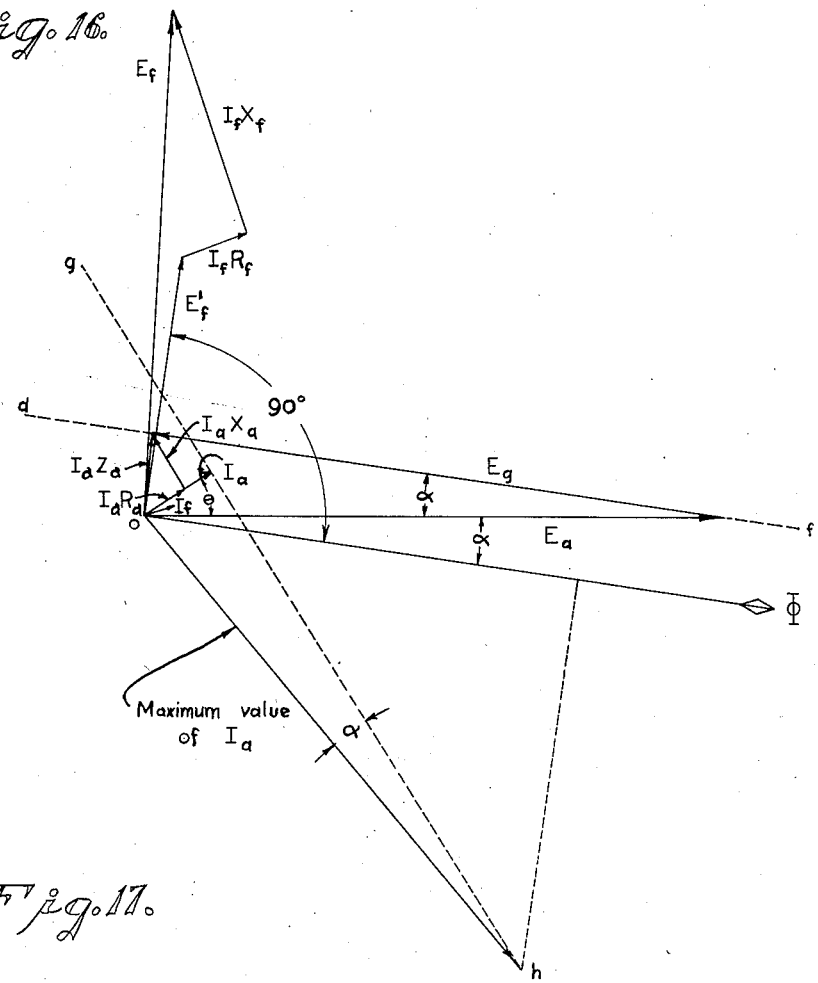
Fig. 16 is a vector diagram showing the voltages, currents, and the respective loci thereof, for a given speed-setting of any one of the motor-apparatus shown in the preceding figures.

In carrying out the present invention, various combinations of field-windings, commutator-type armatures or rotors, field-circuit controls, armature-circuit controls, etc., may be employed, and for purposes of making clear some of the many possible combinations, fifteen are shown schematically or diagrammatically in Figs. 1 to 15 respectively. Each form of the present invention herein shown and described, however, embodies the same unique characteristics as is common to all of the other forms.

The motor-apparatus of Fig. 1

The adjustable-speed motor-apparatus illustrated in Fig. 1, is shown as connected to a 3-phase supply system comprising line-conductors 1, 2 and 3, and includes a motor-structure proper generally designated by the reference character $M_1$ and a control-device generally designated by the reference character $CD_1$. The said control-device $CD_1$ comprises in the main an adjustable auto-transformer $T_1$ together with associated wiring, and an adjusting-member $AM_1$.

The motor-structure proper $M_1$ may, for purposes of convenience of description, be said to comprise a field-circuit generally designated by the reference character $FC_1$ and an armature-circuit generally designated by the reference character $ArC_1$. The field-circuit $FC_1$ includes a main field-winding $FW_1$ having two lead-wires or terminals, one of which is connected directly to the line-conductor 1 of the supply and the other of which is connected to a tap at $X_1$ of the auto-transformer $T_1$.

The armature-circuit $ArC_1$ includes a commutator-type armature $Ar_1$ and a short-circuited compensating-winding $CW_1$. The said compensating-winding $CW_1$ is located so that its magnetic axis is substantially at a right angle (electrical degrees) with respect to the magnetic axis of the main field-winding $FW_1$. The said compensating-winding $CW_1$ is, by virtue of its location and association, inductively coupled to the armature $Ar_1$ and is related thereto in such manner as to produce a flux substantially equal in magnitude to the flux produced by the current flowing through the said armature $Ar_1$. In other words, the said compensating-winding $CW_1$, as thus constructed and arranged, has capacity for substantially neutralizing the flux produced in the armature by the armature-current.

One of the brushes of the commutator-type armature $Ar_1$ is connected directly, as shown, to one of the fixed terminals of the auto-transformer $T_1$ and also to the line-conductor 3. The other terminal of the said auto-transformer is connected to the line-conductor 2. The remaining brush of the armature $Ar_1$ is connected as shown to the adjusting-member $AM_1$ of the auto-transformer $T_1$, so that the voltage applied to the said armature may be varied as desired to vary the speed.

The construction and arrangement of features shown in Fig. 1 and above described, is such that the voltage applied to the field-winding $FW_1$ is shifted in time-phase with respect to the voltage applied to the armature $Ar_1$, to such a degree that the voltage generated by the rotation of the said armature in the flux produced by the main field-winding $FW_1$ is approximately 180 electrical degrees out of phase with the voltage applied to the armature $Ar_1$. This angle for best operation is somewhat less than 180 electrical degrees (see Fig. 16) and is a function of the constants of the field-circuit (resistance and reactances of the field-winding) and of the phase-positions of the field-circuit voltage and the armature-circuit voltage. This angle can be adjusted for any given motor merely by selecting the proper tap $X_1$ on the auto-transformer $T_1$.

The result of the above relationships is such that the flux produced by the voltage of the field-circuit $FC_1$ and passing through the armature $Ar_1$ is from about 0 electrical degrees to about 30 electrical degrees behind the voltage of the armature-circuit $ArC_1$. It is preferred, however, that the displacement just referred to should be substantially 10 electrical degrees in the particular motor-apparatus, since optimum performance is achieved at this displacement.

It will be understood that the various windings of the motor-structure proper $M_1$, in common with the other motor-structures herein described, are in accordance with usual practice in alternating-current machines, supported on structures formed of laminated steel or equivalent magnetic material.

It will also be apparent that though the armature $Ar_1$ is shown as having only one pair of brushes, other armatures having multiple poles and hence multiple pairs of brushes, may be employed in place of $Ar_1$ or its equivalent.

Reference may now be had to Fig. 16, in which is shown the vector diagram of a typical motor of the present invention. The voltage applied to the field is $E_f$. The back E. M. F. in the field is produced by the field resistance, the field leakage reactance, and the flux that is common to both field and armature. These voltage drops are $I_fR_f$, $I_fX_f$ and $E_f'$ respectively. The flux that causes the voltage $E_{f1}$ is shown as the vector $\phi$. The generated voltage in the armature is the vector $E_g$ shown parallel to the flux vector $\phi$. The voltage applied to the armature circuit directly or indirectly through transformer action and through the compensating-winding is $E_a$. This is obtained in the circuit from the transformer $T_1$.

For all conditions of operation the applied voltage $E_a$ is opposed by the generated voltage $E_g$, and the impedance-drop in the armature shown as the vector $I_aZ_a$. Since $E_g$ must at all times be perpendicular to $E_f'$, the locus of $E_g$ is determined in direction but its length is proportional to the speed of the motor. Therefore the extremity of the $I_aZ_a$ vector must lie on the line $df$. Since the locus of $I_aZ_a$ is a straight line the locus of $I_a$ must also be a straight line. In this case the locus of $I_a$ is shown to be $gh$. The power input to the motor armature measured in watts is $E_aI_a \cos \theta$ where $\theta$ is the angle between $E_a$ and $I_a$. At no load the speed of the motor is sufficiently high to swing the $I_aZ_a$ vector counter-clockwise until the $I_a$ vector leads the vector $E_a$ by approximately 90 electrical degrees. Thus the motor will draw a leading armature current at no load. When load is demanded of the motor, a slight reduction of speed will cause $E_g$ to decrease, swinging $I_aZ_a$ and the current $I_a$ clockwise and thereby increasing the power input and the developed torque.

From the foregoing and by reference to the diagram of Fig. 16 in particular, it will be apparent that the adjustable-speed polyphase alternating-current motors of the present invention are characterized by a construction, arrangement and relationship between the field-circuit, the armature-circuit and the external phase-displacing circuits, such that the lead in time-phase between the current taken by the said armature-circuit and the voltage impressed thereon becomes a progressively-larger angle as the work-load on the motor is progressively decreased, and vice versa.

It will further be apparent that the relationships referred to immediately above are such that the current caused in the said armature-circuit by a work-load imposed on the motor, lags the flux produced in the air-gap by the said field-circuit, by an angle having a magnitude such that its tangent is substantially equal to the ohmic-value of the leakage-reactance of the said armature-circuit divided by the ohmic-value of the resistance of the said armature-circuit.

Figure 17:
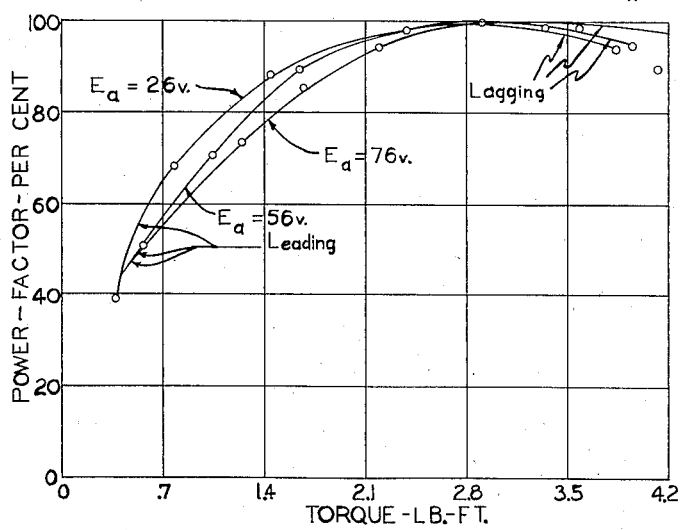
Fig. 17 is a graph showing the power-factor characteristics of the armature-circuit of all of the motor-apparatus shown in Figs. 1 to 15 inclusive for different values of torque-output, the three curves show the power-factor characteristics for high-speed, intermediate-speed, and low-speed settings respectively as plotted from test-data.
Figure 18:
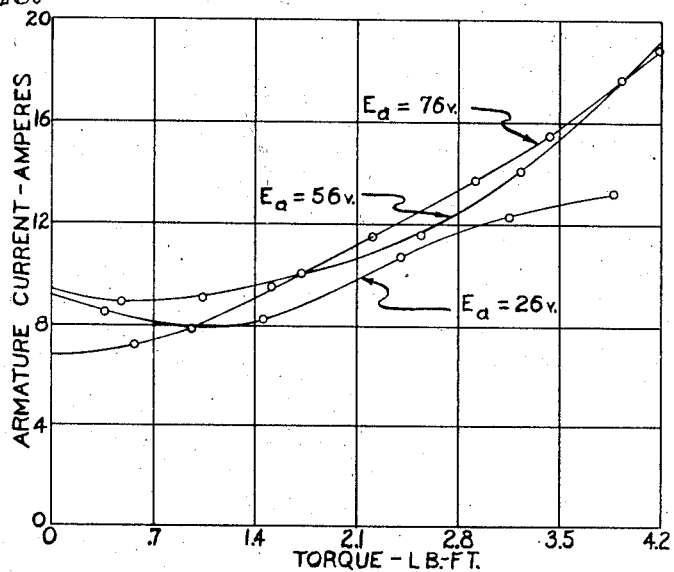
Fig. 18 is a graph indicating the current taken by the armature-circuit for different values of torque-output when adjusted for high-speed, intermediate-speed and low-speed, respectively.
Figure 19:
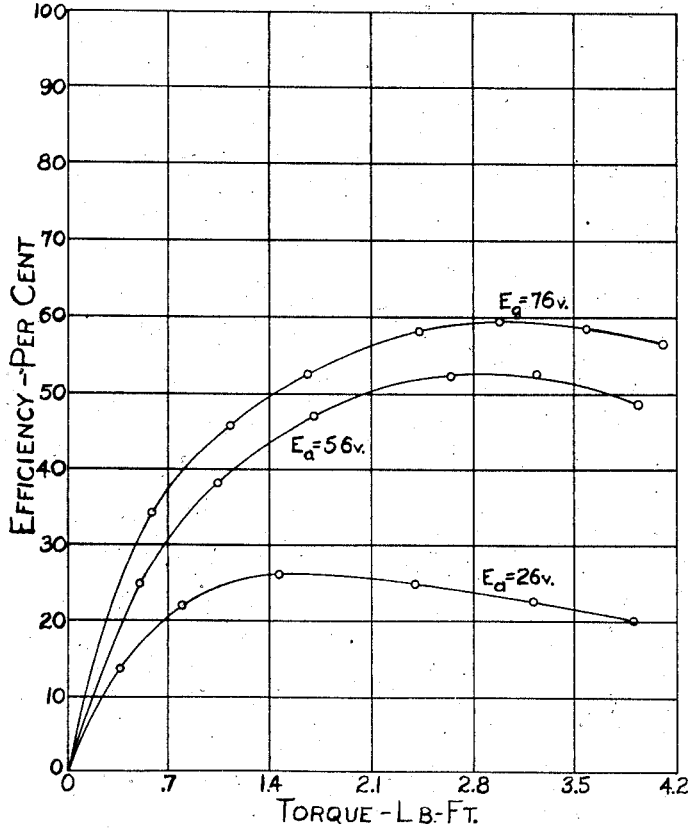
Fig. 19 is a graph illustrating the efficiency of one form of a motor of the present invention, for different speed-adjustments.

The characteristic current curves of this motor for several different values of $E_a$ are shown in Fig. 18. The power-factor of the armature-circuit for these same load tests are shown in Fig. 17. Efficiency curves of the motor for different speed adjustments are shown in Fig. 19.

With the type of motor-apparatus described above, it is possible to control the speed by the adjustment of the armature voltage $E_a$ on the transformer $T_1$. This may be conveniently effected by shifting the adjusting-member $AM_1$ with reference to the auto-transformer $T_1$. An increase in $E_a$ will cause an increase in the speed and vice versa.

Figure 21:
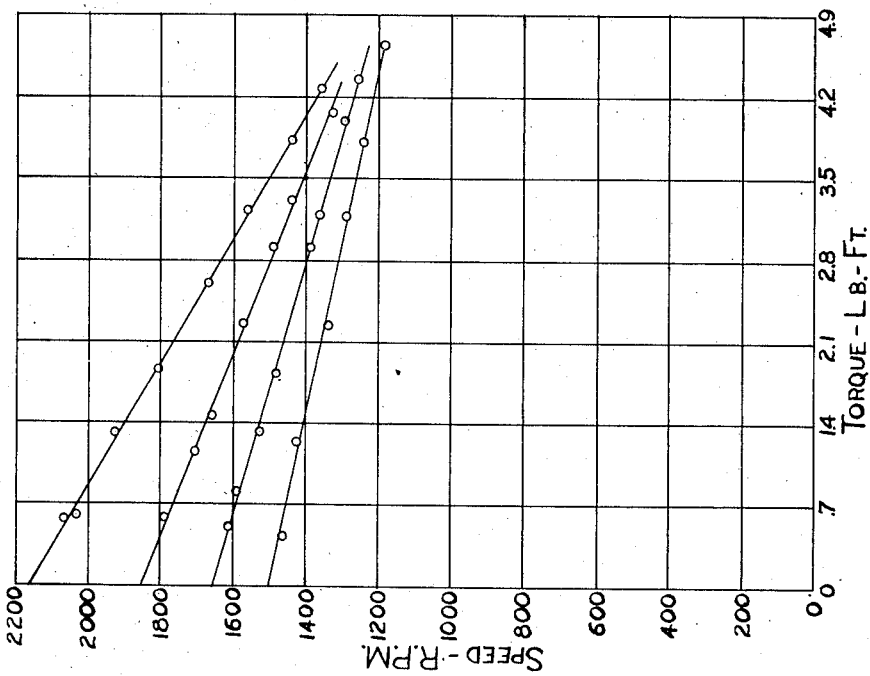
Fig. 21 is a similar view showing the speed-torque characteristics of the motors of Figs. 1 to 15 inclusive with different values of field-voltage.
Figure 20:
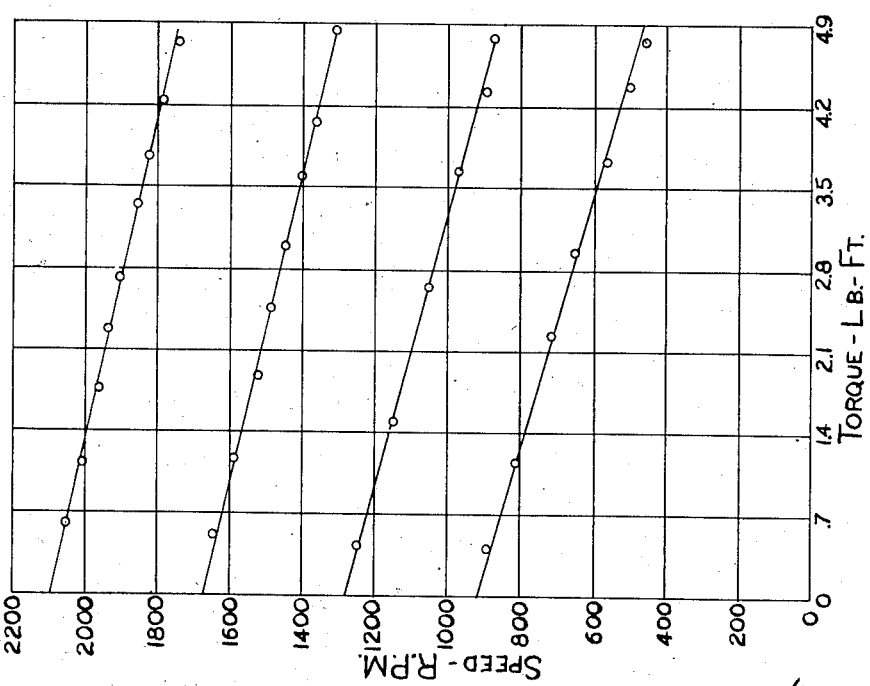
Fig. 20 is a graph showing the speed-torque characteristics of the motors of Figs. 1 to 15 inclusive for different speed-settings.

The speed-torque characteristics of this motor with different values of $E_a$ are shown in Fig. 20. The speed-torque characteristics of this motor with field control are shown in Fig. 21.

The motor-apparatus of Fig. 2

The motor-apparatus illustrated in Fig. 2 corresponds to that shown in Fig. 1 with the exception that a compensating-winding $CW_2$, basically the same as the compensating-winding $CW_1$, is in series with and therefore conductively coupled to the armature $Ar_1$ rather than being inductively coupled as is the compensating-winding $CW_1$ in the showing of the preceding figure. The individual features of the motor-apparatus of Fig. 2 will therefore bear reference characters corresponding to those employed in connection with Fig. 1 and its description, with the exception that the motor-structure is designated as $M_2$, the armature-circuit is designated $ArC_2$ and the series-connected compensating-winding $CW_2$.

The characteristics of the motor-apparatus of Fig. 2 substantially correspond to the characteristics of the motor-structure of Fig. 1, and therefore the comments given in connection with the latter figure apply to the showing of Fig. 2 also.

The motor-apparatus of Fig. 3

The motor-apparatus of Fig. 3 like the motor-apparatus illustrated in Fig. 1 includes a motor-structure proper $M_1$ and a control-device $CD_1$ functioning as a control for the armature-circuit $ArC_1$. Like the showing of Fig. 1, the motor-structure $M_1$ includes a field-circuit $FC_1$ having a field-winding $FW_1$ but, in this instance, the said field-winding has its upper terminal connected to the adjusting-member $AM_2$ of a control-device $CD_2$. The said control-device $CD_2$ includes an auto-transformer $T_2$ having its upper terminal connected to the line-conductor 1 and having its lower terminal connected to the tap $X_1$ of the auto-transformer $T_1$, in common with the lower terminal of the field-winding $FW_1$.

Other features of the showing of Fig. 3 not specifically referred to, bear reference characters corresponding to those employed in connection with Fig. 1.

The speed of the motor of Fig. 3 may be regulated by shifting the adjusting-member $AM_1$ as was described in connection with Fig. 1, or the speed of the motor may be regulated by adjusting the adjusting-member $AM_2$ of the control-device $CD_2$ to thereby vary the voltage impressed upon the field-winding $FW_1$. An increase in the voltage on $FW_1$ will cause a reduction in speed and vice versa.

The characteristics of the motor-apparatus of Fig. 3 are in general the same as the characteristics of the motor-structure of Fig. 1 and reference may be had to the description of the motor-apparatus of the said figure for a more complete understanding of the characteristics of the showing of Fig. 3.

The motor-apparatus of Fig. 4

In Fig. 4 is illustrated a motor-apparatus of the same character as that shown in Fig. 3 with the exception that the motor-structure $M_2$ of Fig. 2 has been substituted for the motor-structure $M_1$. In other words, the motor-apparatus of Fig. 4 corresponds to that of Fig. 3 with the exception that the compensating-winding $CW_2$ is employed and electrically connected in series and therefore conductively coupled with the armature $Ar_1$ rather than being inductively coupled as is the compensating-winding $CW_1$ in Fig. 3.

By reference to Figs. 16 to 21 inclusive, and the comments respecting the showings made in connection with the description of the motor-apparatus of Fig. 1, the basic character of the motor-apparatus of Fig. 4 will be apparent.

The motor-apparatus of Fig. 5

In this figure the motor-apparatus corresponds to the showing of Fig. 3 and the parts bear like reference characters, with the exception that the control-device $CD_2$ has been omitted and in place thereof a two-winding transformer $T_3$ has been inserted in the apparatus. The said two-winding transformer $T_3$ comprises a primary winding $P_3$ and a secondary winding $S_3$. The primary winding $P_3$ has its lower terminal connected to the tap $X_1$ of the auto-transformer $T_1$ while its upper terminal is connected directly to the line-conductor 1. The respective opposite terminals of the secondary winding $S_3$ are connected, in turn, to the corresponding terminals of the field-winding $FW_1$ of the motor-structure $M_1$.

The speed of the motor may like the showings of the preceding figures be controlled by shifting the adjusting-member $AM_1$ of the control-device $CD_1$. Other characteristics of the showing of Fig. 5 correspond basically to those of the motor-apparatus of the preceding figures and do not require repetition here.

The motor-structure of Fig. 6

This motor-apparatus corresponds to that shown in Fig. 5 with the exception that the motor-structure proper $M_2$ of Figs. 2 and 4 has been substituted for the motor-structure proper $M_1$ of Fig. 5.

Operational characteristics of the motor-apparatus of Fig. 6 are basically the same as the characteristics of the motor-apparatus previously described.

The motor-apparatus of Fig. 7

In the motor-apparatus now being described, the identical elements shown in Fig. 1 are employed, but their arrangements are altered as will now be described.

In particular it will be noted that the armature-circuit $ArC_1$ of Fig. 7 occupies the position in the circuit which is occupied by the field-circuit $FC_1$ of Fig. 1. Here also the field-circuit $FC_1$ of Fig. 7 occupies the relationship to the remainder of the apparatus and to the line-conductors 1, 2 and 3 as is occupied by the armature-circuit $ArC_1$ of Fig. 1.

Under this construction and arrangment of parts, the control-device $CD_1$ acts to vary the voltage impressed upon the field-winding $FW_1$ to control the speed of the motor rather than controlling the voltage applied to the armature-circuit $ArC_1$.

An adjustment of the adjusting-member $AM_1$ of the control-device $CD_1$ such as will raise the voltage impressed upon the field-winding $FW_1$ will cause a reduction in the speed of the motor and vice versa.

The motor-apparatus of Fig. 8

The showing of Fig. 8 corresponds to the showing of Fig. 7 with the exception that the motor-structure $M_2$ of Figs. 2, 4 and 6 has been substituted for the motor-structure $M_1$.

By this construction and arrangement of parts, the motor-apparatus of Fig. 8 differs from that of Fig. 7 only in that the compensating-winding $CW_2$ thereof is conductively coupled in series with the commutator-type armature, rather than being inductively coupled thereto, as is the compensating-winding $CW_1$ in the showing of Fig. 7.

The motor-apparatus of Fig. 9

The motor-apparatus of Fig. 9 shows the combination of the two-winding transformer $T_3$ of Fig. 5 with the armature-circuit of the motor-apparatus of Fig. 7.

Like the motor-apparatus of Fig. 5, the lower terminal of the primary-winding $P_3$ of the transformer $T_3$ is connected to the tap $X_1$ of the auto-transformer $T_1$. The upper terminal of the primary-winding $P_3$ is connected to the line-conductor 1 of the 3-phase supply. The secondary-winding $S_3$ of the transformer $T_3$ has its respective opposite terminals connected to the respective opposite terminals of the commutator-type armature $Ar_1$ of the armature-circuit $ArC_1$.

The respective elements of the showing of Fig. 9 have applied thereto reference characters previously identified in connection with the description of the motor-apparatus of preceding figures.

The motor-apparatus of Fig. 10

The motor-apparatus of Fig. 10 corresponds to that shown in Fig. 9 with the exception that the motor-structure $M_1$ of Fig. 9 has been replaced by the motor-structure $M_2$ of Figs. 2, 4, 6 and 8. In other words, it may be said that the motor-apparatus of Fig. 10 differs from that of Fig. 9 only in that the conductively-coupled series-connected compensating-winding $CW_2$ is employed in place of the inductively-coupled compensating-winding $CW_1$.

The elements of the motor-apparatus of Fig. 10 bear reference characters corresponding to reference characters applied to corresponding elements in preceding figures.

The motor-apparatus of Fig. 11

In this figure, the motor-apparatus corresponds to that shown in Fig. 1 and the elements bear like reference characters. Here, however, instead of being connected to a 3-phase supply, the motor-apparatus is connected to a 2-phase (three-wire) supply.

In Fig. 11 the upper line-conductor 1 may be viewed as being the first-phase line-conductor, while the bottom-conductor 2 may be viewed as the second-phase line-conductor, and the intermediate conductor marked "N" may be considered as the neutral line-conductor.

Thus, the outer terminal of the auto-transformer $T_1$ is connected to the neutral line-conductor N instead of to the second-phase line-conductor 2 as in Fig. 1. Similarly, the upper terminal of the field-winding $FW_1$ is connected to the first-phase line-conductor 1, as is the case in Fig. 1. The right-hand terminal of the auto-transformer $T_1$ and hence, also, the left-hand brush of the armature $Ar_1$ is however in this instance connected to the second-phase line-conductor 2 in Fig. 11, rather than being connected to the third-phase line-conductor 3 of Fig. 1. The operation and characteristics of the motor-apparatus of Fig. 11, however, basically correspond to those of the motor-apparatus of Fig. 1.

The motor-apparatus of Fig. 12

In this figure, the motor-apparatus corresponds to that shown in Fig. 2 but instead of being connected to a 3-phase supply, the motor-apparatus of Fig. 12 is connected to a 2-phase supply in the same manner as the motor-apparatus of Fig. 11.

From another angle, the showing of Fig. 12 may be said to differ from the showing of Fig. 11 only in that the motor-structure $M_2$ proper is substituted for the motor-structure $M_1$ proper and hence the series-connected and conductively-coupled compensating-winding $CW_2$ is employed instead of the inductively-coupled compensating-winding $CW_1$.

The motor-apparatus of Fig. 13

Here, the motor-apparatus corresponds to that shown in Fig. 3 and bears like reference characters for the appropriate elements. In Fig. 13, however, the apparatus is employed in conjunction with a 2-phase (three-wire) supply comprising what may be termed a "first-phase" line-conductor 1, a second-phase line-conductor 2 and a neutral conductor N.

Like the showing of Fig. 3, the upper terminal of the auto-transformer $T_2$ is connected to the first-phase line-conductor 1, and the left terminal of the auto-transformer $T_1$ is connected to the second-phase line-conductor 2. The right-hand terminal of the auto-transformer $T_1$ and the left-hand brush of the armature $Ar_1$ is connected to the neutral line-conductor N, instead of being connected to a third-phase line-conductor 3 as in the showing of Fig. 3.

The motor-apparatus of Fig. 14

Fig. 14 illustrates the motor-apparatus of Fig. 4 as properly connected to a 2-phase (three-wire) supply, comprising what may be conveniently described as a first-phase line-conductor 1, a second-phase line-conductor 2 and a neutral line-conductor N.

Like the showing of Fig. 4, the upper terminal of the auto-transformer $T_2$ is connected to the first-phase line-conductor 1, and the left terminal of the auto-transformer $T_1$ is connected to a second-phase line-conductor 2. Here, however, the right-hand terminal of the auto-transformer $T_1$ and the left brush of the armature $Ar_1$ are connected to the neutral line-conductor N, instead of being connected to the third-phase line-conductor 3, as is the case in the showing of Fig. 4.

The motor-apparatus of Fig. 15

All of the motor-apparatus above described may have their armatures or rotors reversed in direction by reversing the direction of the current-flow in either the field-circuit or in the armature-circuit. For the purpose of making clear one mode of effecting the reversal of the armature or rotor of a motor-apparatus embodying the present invention, Fig. 15 is included in the accompanying drawings.

In Fig. 15, the elements correspond to those shown in Fig. 1 with the exception that a control-device $CD_3$ is employed, instead of the control-device $CD_1$. The control-device $CD_3$ includes an auto-transformer $T_1$ having two taps $X_1$ and $X_2$ and an adjusting-member $AM_1$.

The left-hand terminal of the auto-transformer $T_1$ is connected to the second-phase line-conductor 2, while the right-hand terminal of the said auto-transformer is connected to the third-phase line-conductor 3. The left-hand brush of the armature or rotor $Ar_1$ is connected to the tap $X_2$ of the auto-transformer $T_1$, while the right-hand brush of the said armature is connected to the adjusting-member $AM_1$.

Like the showing of Fig. 1, the lower terminal of the field-winding $FW_1$ is connected to the tap $X_1$ of the auto-transformer $T_1$ in the control-device $CD_3$, while the upper terminal of the said field-winding is connected to the first-phase line-conductor 1.

When the armature $Ar_1$ is supplied with the voltage available between the tap $X_2$ and the adjusting-member $AM_1$ (when the latter is in the position in which it is shown by full lines in Fig. 15), the armature or rotor will turn in one direction. If, however, the adjusting-member $AM_1$ is shifted into the position in which it is shown by broken lines in Fig. 15, the armature or rotor will reverse in direction, inasmuch as the current flowing therethrough will itself be reversed in direction, as compared to what it was when the adjusting-member $AM_1$ was in the position shown by full lines in Fig. 15. If the adjusting-member $AM_1$ is moved rapidly from one side of the tap $X_2$ to the other side thereof, the motor-structure proper will act as a generator and regenerative braking will result, so that power will be fed back on the voltage supply and a large decelerating-torque will be produced.

General considerations

The showings of Figs. 16 to 21 inclusive apply substantially equally to all of the motor-apparatus illustrated in the preceding figures and the detailed comments given in connection with the showing of Fig. 1 with respect to the vector diagram, etc., apply with equal force to the motor-structures of Figs. 2 to 15 inclusive.

From the foregoing description and by reference to the accompanying drawings, it will be noted that the armature or rotor may be reversed in direction by reversing the direction of current-flow either in the armature-circuit or in the field-circuit.

It will also be understood from the foregoing, considered in conjunction with the accompanying drawings, that the speed of the armature or rotor in all the forms of the invention herein shown, may be increased by increasing the voltage applied to the armature-circuit, or by decreasing (within practical limits) the voltage applied to the field-circuit. Conversely, the speed of an armature or rotor may be decreased by decreasing the voltage applied thereto or by increasing the voltage applied to the field-winding.

By means of the present invention, a rotor or armature may be set to a selected speed and remain substantially at such selected speed, despite relatively-large changes in the horsepower output. The said speed may be varied in infinite degree throughout the entire speed-range of the motor between zero speed and maximum speed.

The motor-apparatus of the present invention provide for obtaining adjustable speed from an A. C. motor and at the same time provide means whereby the motor takes either leading currents or high power-factor lagging currents over its operating range with respect to both speed and load.

It will also be apparent from the present disclosure that the armature or rotor may be reversed in direction without requiring the phase-reversal of the supply-voltage. It is also to be noted that by means of the present invention, large values of starting-torque are provided without requiring the drawing of excessive currents either in the motor or in the supply-lines.

Furthermore, by means of the present invention, the armature or rotor may be rapidly accelerated without drawing excessive motor-currents or line-currents.

It will be apparent to those skilled in the art that the commutator-type armature herein shown may be one in which its windings are short-circuited through its brushes or one which is conductively supplied. The short-circuited-type armature would, of course, be employed in conjunction with a conductively-coupled compensating-winding.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An adjustable-speed polyphase alternating-current motor apparatus having substantially-constant speed characteristics at different torque values and including in combination: a field-circuit constructed and arranged to produce magnetic flux for passage through an armature; an armature-circuit comprising a commutator-type armature and a compensating-winding coupled to the said commutator-type armature; a transformer coupled to both the said field-circuit and the said armature-circuit and having an intermediate-tap connected to one of the said circuits and located at a predetermined point on its winding such that the mutual flux developed by the field-current and passing through the field-circuit and the armature of the armature-circuit establishes in the field-circuit a counter-electromotive force which lags the armature-voltage in time-phase by an angle between 90 and 120 electrical degrees; the said field-circuit, the said armature-circuit and the said intermediate-tap of the transformer being constructed, arranged and proportioned with respect to each other so that the angle of lead in time-phase of the current taken by the said armature-circuit with respect to the voltage impressed thereon becomes progressively larger as the work-load on the motor is progressively decreased, and vice versa; and control-means connected to one of the aforesaid circuits and constructed and arranged to selectively vary the voltage applied thereto to selectively vary the speed of the commutator-type armature of the said armature-circuit.

2. An adjustable-speed polyphase alternating-current motor apparatus having substantially-constant speed characteristics at different torque values and including in combination: a field-circuit constructed and arranged to produce magnetic flux for passage through an armature; an armature-circuit comprising a commutator-type armature and a compensating-winding coupled to the said commutator-type armature; a transformer coupled to both the said field-circuit and the said armature-circuit and having an intermediate-tap connected to one of the said circuits and located at a predetermined point on its winding such that the mutual flux developed by the field-current and passing through the field-circuit and the armature of the armature-circuit establishes in the field-circuit a counter-electromotive force which lags the armature-voltage in time-phase by an angle between 90 and 120 electrical degrees; the said field-circuit, the said armature-circuit and the said intermediate-tap of the transformer being constructed, arranged and proportioned with respect to each other so that the component of the current caused in the said armature-circuit by a work-load imposed on the motor, lags the flux produced in the air-gap by the said field-circuit, by an angle having a magnitude such that its tangent is substantially equal to the ohmic-value of the leakage-reactance of the said armature-circuit divided by the ohmic-value of the resistance of the said armature-circuit; and control-means connected to one of the aforesaid circuits and constructed and arranged to selectively vary the magnitude of the voltage applied thereto to selectively vary the speed of the commutator-type armature of the said armature-circuit.

3. An adjustable-speed polyphase alternating-current motor apparatus having substantially-constant speed characteristics at different torque values and including in combination: a field-circuit constructed and arranged to produce magnetic flux for passage through an armature; an armature-circuit comprising a commutator-type armature and a compensating-winding coupled to the said commutator-type armature; a transformer coupled to both the said field-circuit and the said armature-circuit and having an intermediate-tap connected to one of the said circuits and located at a predetermined point on its winding such that the mutual flux developed by the field-current and passing through the field-circuit and the armature of the armature-circuit produces in the field-circuit a counter-electromotive force which lags the armature-voltage in time-phase by an angle between 90 and 120 electrical degrees; the said field-circuit, the said armature-circuit and the said intermediate-tap of the transformer being constructed, arranged and proportioned with respect to each other so that the angle of lead in time-phase of the current taken by the said armature-circuit with respect to the voltage impressed thereon becomes progressively larger as the work-load on the motor is progressively decreased, and vice versa, and the component of the current caused in the said armature-circuit by a work-load imposed on the motor, lags the flux produced in the air-gap by the said field-circuit, by an angle having a magnitude such that its tangent is substantially equal to the ohmic-value of the leakage-reactance of the said armature-circuit divided by the ohmic-value of the resistance of the said armature-circuit; and control-means connected to one of the aforesaid circuits and constructed and arranged to selectively vary the magnitude of the voltage applied thereto to selectively vary the speed of the commutator-type armature of the said armature-circuit.

4. An adjustable-speed polyphase alternating-current motor apparatus having substantially-constant speed characteristics at different torque values and comprising a field-circuit including a field-winding, an armature-circuit including a commutator-type armature and a compensating-winding, means to energize said circuits, the energized field-circuit producing a flux through said armature, the flux mutual to the armature and field-circuits generating a counter-electromotive force in said field-circuit, a transformer connected to both of said circuits and having a winding, a fixed tap connected to one of said circuits and connected to a predetermined intermediate point on said winding, the position of said tap causing the said counter-electromotive force to lag the voltage applied to the armature-circuit in time-phase by an angle between 90 and 120 electrical degrees, the total armature-input current being substantially in phase with said field-flux when the motor is operated under a full work-load, and an adjustable controlling-means in circuit with the transformer to selectively vary the voltage applied to one of said circuits for regulating the speed of armature rotation.

ALBERT G. CONRAD.